June 26, 1956  R. R. HESSEMER  2,751,736
DRAG CUTTER ASSEMBLY FOR CLEARING LAND
Filed Oct. 19, 1953  2 Sheets-Sheet 1

Robert R. Hessemer
INVENTOR.

BY *Clarence A. O'Brien*
*and Harvey B. Jackson*
Attorneys

June 26, 1956 R. R. HESSEMER 2,751,736
DRAG CUTTER ASSEMBLY FOR CLEARING LAND
Filed Oct. 19, 1953 2 Sheets-Sheet 2
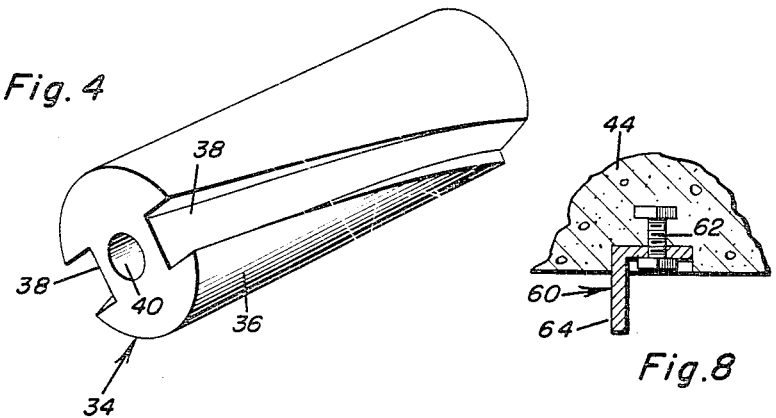
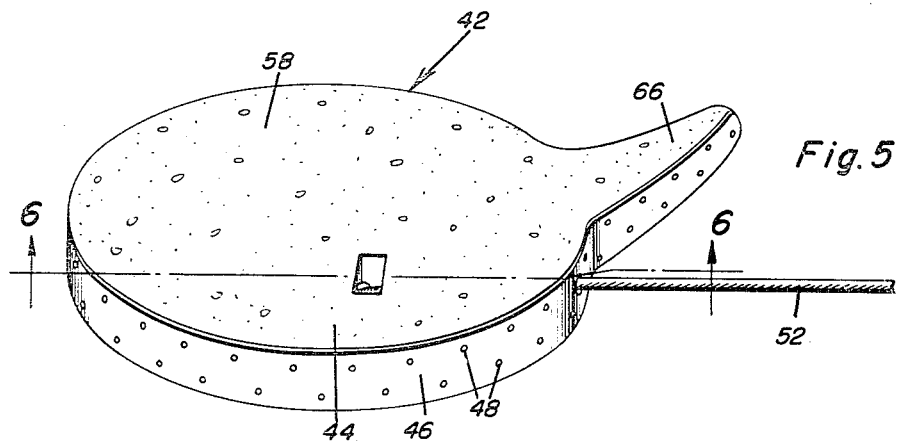
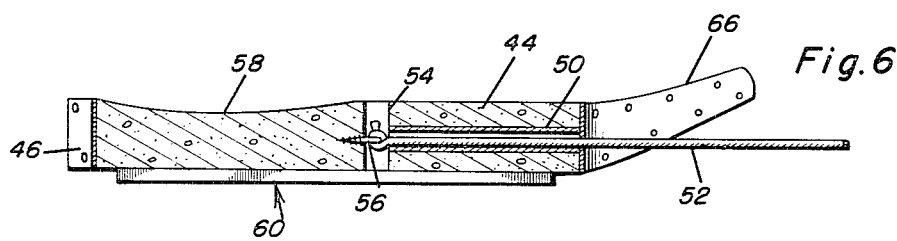
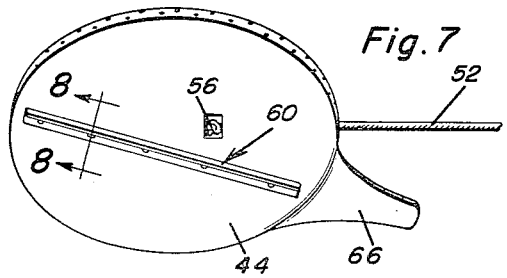
Robert R. Hessemer
INVENTOR.

United States Patent Office 2,751,736
Patented June 26, 1956

2,751,736

DRAG CUTTER ASSEMBLY FOR CLEARING LAND

Robert R. Hessemer, Houston, Tex.

Application October 19, 1953, Serial No. 386,839

4 Claims. (Cl. 55—60)

This invention relates to an improved means and method of clearing land, and pertains more particularly to apparatus for use in conjunction with a powered vehicle and utilizing the forward motion thereof to effectively cut down large growths of trees, shrubs, and the like.

In many areas, a problem has arisen in recent years due to the springing up of large growths of cactus, mesquite, cedar bush, and the like, which have invaded grazing lands to such an extent that cattle ranchers are hard pressed to find adequate grazing land for their stock. Also, common clearing methods require considerable time to clear a given area of land.

It is, therefore, a primary object of this invention to provide an improved method and means for practicing the same which will enable land to be cleared much more rapidly and economically than with methods presently known.

Another object of this invention is to provide improved apparatus for clearing lands which embodies a flexible cutter assembly attached and towed behind a powered vehicle with a weight being provided at the free end of the assembly for tensioning the same, the vehicle being driven in a non-linear path such that the cutter assembly will effect a lateral cutting force against vegetation adjacent thereto.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a perspective view of a modified form of cutting elements;

Figure 5 is a perspective view of the drag element;

Figure 6 is a longitudinal section taken substantially along the plane of section line 6—6 of Figure 5 showing details of construction of the drag assembly;

Figure 7 is a perspective view showing the bottom surface of the assembly shown in Figure 5; and Figure 8 is an enlarged transverse section taken substantially along the plane of section line 8—8 of Figure 7 showing details of the rudder mounting.

Figure 1:
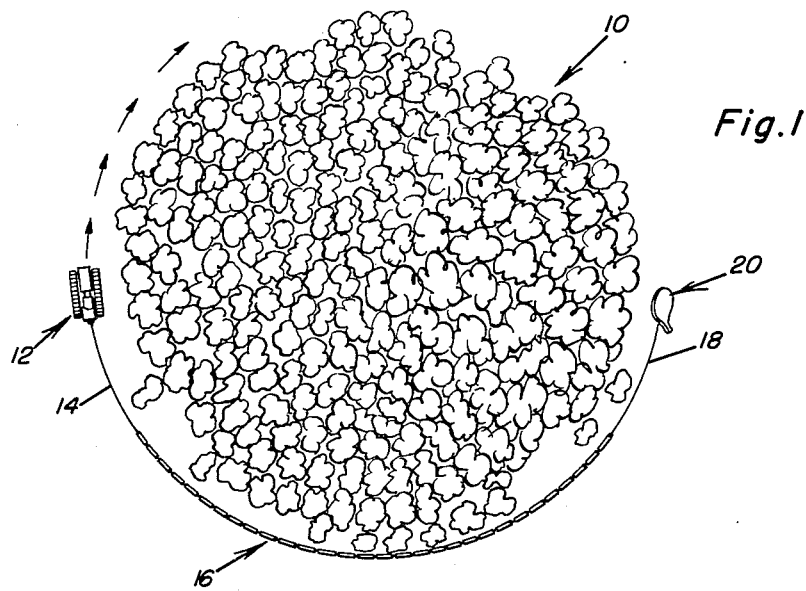
Figure 1 is a plan view showing the invention in use.

Referring now more particularly to the drawings, reference numeral 10 indicates generally a substantial growth of undesirable vegetation such as cactus, mesquite, cedar bush or the like, which is desired to be cleared. The method employed in clearing this area involves the use of a suitable powered vehicle indicated generally by the reference character 12 which may take the form of a tractor or any other suitable powered vehicle, to which is connected a length of cable 14 which is in turn connected to a length of cutting elements indicated generally by the reference character 16, the cutting assembly being provided with a rear cable section 18 connecting to a drag member 20, in the manner shown. The principles involved in clearing the land are the result of the weight of the drag member 20 and the path of movement of the vehicle 12, which cooperate to produce a lateral or radially inwardly directed force to the cutting assembly 16 which, taken in conjunction with its forward movement, will provide a cutting action on the shrubs or vegetation to remove the same. The tractor or vehicle 12 is driven around and around the area desired to be cut until all of the vegetation has been cut down.

Figure 2:
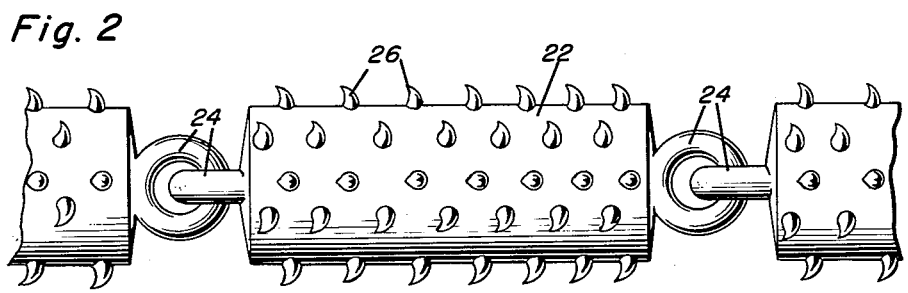
Figure 2 is an enlarged elevational view showing a portion of the cutting assembly.

Referring now more particularly to Figure 2 one form of the cutting assembly is shown which incorporates a series of cutter elements 22 of substantially cylindrical configuration which are provided at their opposite ends with link members 24 interlocked with corresponding link members of adjacent elements such that the cutters are disposed in chain-like fashion. The outer surface of the cutter members are provided with a plurality of radially projecting hooked teeth 26 which operate to produce the cutting action as the cutting assembly is moved along.

Figure 3:
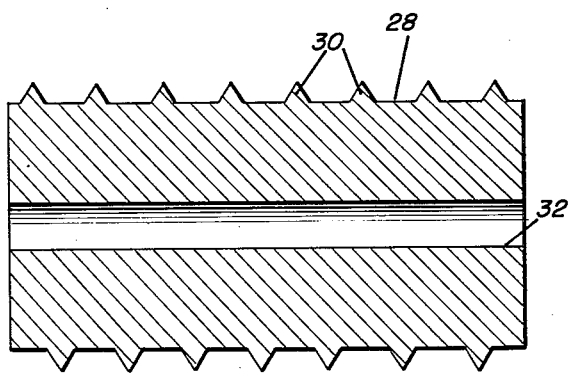
Figure 3 is a longitudinal section taken through the median line of a modified cutting element.

In Figure 3, a longitudinal section taken through one of the cutter elements of a modified form of cutter assembly is shown which incorporates a cylindrical body portion 28 having a series of teeth 30 provided on its outer surface of the configuration shown and which is provided with a longitudinally extending bore 32 to receive a cable such as 18 of Figure 1 or other suitable flexible mechanism, the various cutter elements being threaded upon the cable or other flexible element much in the manner of a string of beads.

Referring now more particularly to Figure 4 wherein a still further modified form of cutter element is shown, it will be seen that this particular cutter element 34 incorporates a cylindrical body portion 36 having helical fluted portions 38 therein disposed at diametrically opposed points thereon whose outer edges provide cutting edges. These cutters are also provided with a longitudinal bore 40 for stringing on a suitable flexible element.

It will be manifest that the cutter elements during their cutting operation will operate much in the same manner as files in cutting away the material of the undesirable vegetation.

As seen most clearly in Figure 5, the drag member indicated generally by the reference character 42 includes a main body portion 44 which preferably takes the form of concrete material suitably moulded within and bounded by the peripheral strap member 46 which is preferably formed of metallic material to provide wear resistance. The strap may be provided with a series of headed stud members 48 projecting within the concrete body portion 44 for secure engagement therewith. The forward portion of the main body 44 is provided with a longitudinally extending sleeve 50 through which the cable member 52 extends and a vertical bore 54 communicating with the inner end of the sleeve 50 provides a recess for the fastener element 56 to which the free end of the cable 52 is attached. The upper surface of the rearward portion of the drag assembly is dished as at 58 such as to provide a receptacle for additional weights, as desired. Embedded in the under surface of the drag assembly is an angle member 60, as seen most clearly in Figure 8, and rigidly affixed thereto as by suitable fasteners 62 such that the depending leg portion 64 of the angle extends longitudinally of the drag assembly and provides a rudder therefor.

A projecting ear portion 66 of the main body extends obliquely from the forward end portion thereof as seen most clearly in Figure 5 and it will be also noted that this projecting portion or ear inclines slightly upwardly in the manner illustrated most clearly in Figure 6.

The cooperation between the oblique ear 66 and the rudder 60 is such as to tend to steer the drag assembly away from the vegetation being cut so that the drag assembly will not become entangled therein, the ear 66 acting more or less in the manner of a snow plow blade and the rudder acting in the manner its name implies.

The oblique ear is intended to project upwardly and away from vegetation being cut in order that it will tend to ride over obstructions or uneven terrain and pull the cutters or cable out of the cut or slot made in individual trees and the like where the cutting has not been completed with the first passage of the cutters.

In this manner, it will be manifest that the powered vehicle is driven in a curvilinear path to continuously bow the cutting assembly 16 with the drag assembly 20 tensioning the same so that the cutter elements will bear sideways against the vegetation to be cut and perform their intended function.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A cutter assembly for clearing land comprising a plurality of elongated cutter elements flexibly interconnected in end-to-end relation, a drag member secured to an end one of said cutter elements, means for connecting the opposite end one of said cutter elements to a powered vehicle, said drag member being in the form of a flat plate having a rudder member secured to and depending from the bottom surface thereof and extending longitudinally therealong.

2. A cutter assembly for clearing land comprising a plurality of elongated cutter elements flexibly interconnected in end-to-end relation, a drag member secured to an end one of said cutter elements, means for connecting the opposite end one of said cutter elements to a powered vehicle, said drag member being in the form of a flat generally circular weight having a rudder member secured to and depending from the bottom surface thereof and extending diametrically thereacross, the upper surface of said drag member being dished to retain weight members thereon.

3. A cutter assembly for clearing land comprising a plurality of elongated cutter elements flexibly interconnected in end-to-end relation, a drag member secured to an end one of said cutter elements, means for connecting the opposite end one of said cutter elements to a powered vehicle, said drag member being in the form of a flat plate having front and rear portions, and a rudder member secured to the bottom surface of said drag member and extending longitudinally thereof, the front portion of said drag member being provided with an obliquely outwardly projecting portion for urging the drag member in a direction lateral to its path of movement over the ground surface.

4. In a cutter assembly for clearing land comprising a plurality of elongated cutter elements flexibly interconnected in end to end relation, a self-guiding drag member adapted to be attached by means of a flexible element to an end one of said cutter elements comprising a generally circular, flat plate having an elongated rudder secured to and depending from the bottom surface thereof, said plate having means for attaching a flexible element thereto for extension therefrom at an angle from said rudder, said plate having an outwardly, upwardly projecting ear extending from the periphery thereof in general alignment with said rudder.

References Cited in the file of this patent
UNITED STATES PATENTS 1,897,820     Pitchford _____ Feb. 14, 1933